Patented Aug. 25, 1936

2,052,219

UNITED STATES PATENT OFFICE 2,052,219

VITAMIN CONCENTRATE FROM ASPARAGUS AND PROCESS OF MAKING SAME

Charles Dickens, Oakland, Calif.

No Drawing. Application October 26, 1932,
Serial No. 639,746

5 Claims. (Cl. 167—81)

This invention relates to a method of making a vitamin concentrate suitable for use as or in food and medicine from asparagus.

It is known that asparagus contains the antineuritic vitamin B in appreciable quantities, as well as the other water soluble vitamins F and G. These vitamins are essential to the maintenance of the health status of the human body.

An object of the invention is to provide an economical method for the production of a vitamin concentrate from asparagus. Another object of the invention is to provide a vitamin concentrate from asparagus which is adapted to use as or in foods and medicines. A further object of the invention is the recovery of a vitamin concentrate from portions of asparagus in which it would otherwise be wasted, such as the stems and other portions discarded at packing plants.

In accordance with my invention the water soluble vitamin content of asparagus, vitamins B, F and G, but principally vitamin B, are separated from the principal constituents of the asparagus, i. e. the fiber, chlorophyll and asparagine, and recovered in the form of an aqueous solution of high vitamin potency.

In a companion application filed on Oct. 19, 1932, Serial No. 638,649, entitled Process of concentrating the vitamin content of milk and product, I have described a somewhat analogous method for the production of a vitamin concentrate containing principally the vitamins B, F and G from milk. Said process consists essentially in working up the milk or milk product to whey or its equivalent, evaporating the whey at low temperature to about one tenth its volume or less, separating any precipitate which forms on standing, mixing the resulting liquid with alcohol, and separating any precipitate which forms on standing, evaporating the resulting liquid at low temperature to one-half its volume or less to separate the alcohol and further concentrate the vitamin content, and finally separating any precipitate which forms on standing in the course of several days.

The present invention is illustrated by the following specific procedure:

The water soluble portion of the asparagus is separated from the bulk of water insoluble material by—

A, expressing the juice of the fresh asparagus, e. g. by means of a screw or hydraulic press, or B, dehydrating the asparagus under sub-atmospheric pressure and at a temperature not exceeding about 65° C., and extracting the dried asparagus for 24 to 48 hours or more with alcohol, or C, expressing the juice as described under A and combining it with an extract of the pressed residue obtained as described under B. In carrying out method B an aqueous solution of about 25% of either methyl or ethyl alcohol, in quantity amounting to about double the weight of the dried asparagus, is used as the extracting agent.

The liquid obtained by any of these three procedures is concentrated by distillation or evaporation under sub-atmospheric pressure and at a temperature not exceeding about 70° C., preferably between 45° C. and 55° C., to a volume equal to about one tenth that of the original extract. This concentrated extract is allowed to stand until completely settled, for example over night or longer, and the liquid is then separated from solid matter, e. g. by decanting the clear supernatant liquid and filtering or centrifuging the residue. The resulting clear liquid is then mixed with from one fourth to one half its volume of methyl or ethyl alcohol, preferably the latter, of 95% or greater concentration, and the mixture is allowed to stand for about four hours or more, after which the precipitate which has formed is separated. The resulting clear liquid is evaporated or distilled under sub-atmospheric pressure at a temperature not exceeding 70° C., preferably from 45° C. to 55° C., to half its volume or less, whereby the alcohol is separated and the aqueous portion somewhat concentrated. The alcohol may, of course, be recovered for reuse in the process. The resulting concentrated, alcohol free, clear aqueous liquid is now allowed to stand for from one to three days at low temperature, preferably 5° to 15° C., and any precipitate which appears is separated and finally the clear liquid is preserved for use, e. g. by bottling and pasteurizing at 65° C. on at least two successive days. It has a dark golden yellow color and a malty taste and odor.

I claim:

1. Process for the preparation of a concentrate of the water soluble vitamin content of asparagus, substantially free of the principal constituents thereof including fibrous material, chlorophyll and asparagine which comprises preparing an aqueous solution of the water soluble portion of the asparagus substantially equal in volume to the expressible juice of an equal amount of fresh asparagus, concentrating said aqueous solution by evaporation at a temperature not exceeding about 70° C. to about one tenth its volume, allowing the concentrated liquid to stand for several hours and separating filterable solids therefrom, mixing the resulting clear liquid with from about one fourth to one half its weight of alcohol, allowing the mixture to stand and separating filterable solids, and evaporating the resulting clear liquid to not more than one half its volume at a temperature not exceeding 70° C. whereby the alcohol content thereof is removed.

2. Process as defined in claim 1 in which the aqueous solution of the water soluble portion of the asparagus is prepared by expressing the juice of fresh asparagus.

3. Process as defined in claim 1 in which the aqueous solution of the water soluble portion of the asparagus is prepared by dehydrating fresh asparagus at a temperature not exceeding about 65° C. under sub-atmospheric pressure and extracting the dehydrated asparagus with about twice its weight of a liquid consisting of three parts of water to one part of alcohol.

4. Process as defined in claim 1 in which the aqueous solution of the water soluble portion of the asparagus is prepared by expressing the juice of fresh asparagus, dehydrating the residue at a temperature not exceeding about 65° C., extracting the dried residue with about twice its weight of 25% alcohol, and uniting the resulting extract with the expressed juice.

5. Process as defined in claim 1 in which the aqueous solution is concentrated by evaporation at a temperature not exceeding 55° C.

CHARLES DICKENS.